United States Patent
Denecheau et al.

(10) Patent No.: US 7,047,319 B2
(45) Date of Patent: May 16, 2006

(54) SYSTEM AND METHOD FOR ENABLING A COLLISION-FREE PROTOCOL OVER ETHERNET

(75) Inventors: Lionel Denecheau, La Colle-sur-Loup (FR); Denis Esteve, Vence (FR); Patrick Sicsic, La Colle-sur-Loup (FR)

(73) Assignee: International Business Machines Corporation, Armonk, NY (US)

( * ) Notice: Subject to any disclaimer, the term of this patent is extended or adjusted under 35 U.S.C. 154(b) by 726 days.

(21) Appl. No.: 10/076,901

(22) Filed: Feb. 13, 2002

(65) Prior Publication Data

US 2002/0112065 A1  Aug. 15, 2002

(30) Foreign Application Priority Data

Feb. 15, 2001 (EP) ................... 01480013

(51) Int. Cl.
  *G06F 15/16* (2006.01)
  *H04L 12/56* (2006.01)
(52) U.S. Cl. ....................... 709/251; 370/404
(58) Field of Classification Search ................ 709/202, 709/250, 251, 253; 370/403–406, 909
  See application file for complete search history.

(56) References Cited

U.S. PATENT DOCUMENTS

| | | | | |
|---|---|---|---|---|
| 4,058,681 A | * | 11/1977 | Imaizumi et al. ........... 370/245 |
| 4,506,360 A | * | 3/1985 | Kryskow et al. ........... 370/457 |
| 4,766,530 A | * | 8/1988 | Roslund ....................... 709/225 |
| 4,803,485 A | * | 2/1989 | Rypinski ...................... 370/452 |
| 5,404,424 A | * | 4/1995 | Zhao et al. .................. 370/453 |
| 5,802,287 A | * | 9/1998 | Rostoker et al. ......... 370/395.5 |
| 5,999,541 A | * | 12/1999 | Hinchey et al. ............. 370/466 |
| 6,240,094 B1 | * | 5/2001 | Schneider .................... 370/412 |
| 6,442,170 B1 | * | 8/2002 | Perlman et al. ............. 370/401 |
| 2002/0064166 A1 | * | 5/2002 | Suetsugu et al. ........... 370/403 |
| 2002/0163932 A1 | * | 11/2002 | Fischer et al. .............. 370/465 |

OTHER PUBLICATIONS

Venkatramani, C. et al. "Supporting Real-Time Traffic on Ethernet", IEEE Real-Time Systems Symposium, pp. 282-286, Dec. 1994.

* cited by examiner

*Primary Examiner*—Marc D. Thompson
*Assistant Examiner*—J. Bret Dennison
(74) *Attorney, Agent, or Firm*—David L. Adour; Hoffman, Warnick & D'Alessandro LLC

(57) ABSTRACT

A collision-free protocol for transmitting frames between stations connected over a shared transmission medium such as an IEEE 802.3 Ethernet LAN. A logical ring is formed and a token is circulated among the connected stations part of the logical ring (not all connected stations are required to be part of the logical ring). Transmitting from any one station, part of the logical ring, is permitted only while holding the token, therefore preventing collisions. A collision-free protocol, over a standard Ethernet infrastructure, becomes feasible, yet remains compatible with the standard collision protocol, thus improving performances.

3 Claims, 6 Drawing Sheets

SYSTEM AND METHOD FOR ENABLING A COLLISION-FREE PROTOCOL OVER ETHERNET

FIELD OF THE INVENTION

The present invention relates to Local Area Networks (LANs) and more particularly applies to LANs operating with a 'Carrier Sense, Multiple Access, Collision Detect' or CSMA/CD protocol such as Ethernet LANs.

BACKGROUND OF THE INVENTION

Ethernet is a local area network (LAN) technology that allows transmission of information between computers at speeds of 10 million bits per second (Mbps), 100 Mbps (Fast Ethernet) and, more recently, one gigabit ($\times 10^9$) per second. Ethernet assumes that an unlimited number of devices can be connected on a shared transmission medium such as a thick coaxial in the original 10 Mbps Ethernet, as well as thin coaxial, twisted-pair, and fiber optic media in the newer versions. To control the exchange of data between the stations connected on the shared medium, Ethernet uses a protocol called CSMA/CD. This stands for 'Carrier Sense, Multiple Access, Collision Detect'. The 'Multiple Access' part means that every station is indeed connected to the shared transmission forming a single data path. The 'Carrier Sense' part says that before transmitting data, a station checks to see if any other station is already sending something. If the transmission medium appears to be idle then, the station can actually begin to send data. However, two stations can start transmitting at the same time, causing a collision. When this occurs, each interfering station is made able to detect it. Hence, all stations attempting to transmit back off, and try a retransmission at randomly selected later times, thus minimizing the chance of another collision.

This simple mechanism to implement LANs has had great success and has been universally adopted. Indeed, a majority of installed LANs throughout the world are actually Ethernet LANs follow the corresponding IEEE (Institute of Electrical and Electronics Engineers) standard i.e., IEEE 802.3.

Although Ethernet does not set an upper limit to the number of stations that can be connected on a same transmission medium there are, in practice, drastic limitations. Generally speaking, as more users are added to a shared network or, as applications requiring more data are added, performance inevitably tably deteriorates. This is because all users become competitors in trying to use a common resource: the shared transmission medium. It is generally agreed that, on a moderately loaded 10 Mbps Ethernet network being shared by 30–50 users, the network can only sustain throughput in the neighborhood of 2.5 Mbps after accounting for packet overhead, inter packet gaps and collisions resulting from the use of the here above CSMA/CD protocol. Thus, although simple, the CSMA/CD protocol has limitations in its ability to take advantage of the intrinsic performance of the shared transmission medium i.e., 10 Mbps in this example. Further increasing the number of users (and therefore packet transmissions) creates an even higher collision potential. Since collisions occur when two or more stations attempt to send information at the same time, when stations realize that a collision has occurred, they must, to obey standard, all shut off for a random time before attempting another transmission. This tends to add a considerable overhead, severely impacting performance, until the mechanism just collapses when the shared transmission medium is attempted to be too much utilized.

One well-known solution to alleviate this problem is to segment traffic over independent, disjoint, smaller collision domains, however at the expense of having to put in place extra devices to allow communication between the independent pieces thus created of a LAN. This may be a bridge, a hub or a switch. For example, an eight-port high-speed switch can support eight Ethernets, each running at a full 10 Mbps so as to be able to interconnect more users on what appear however to them as a single LAN. Thus, at the expense of creating a more expensive and complicated network which goes against the original objective of the Ethernet LAN to be a very inexpensive solution, simple to deploy and to administrate for local communications typically over a campus or between the employees of a company dispersed over a group of buildings.

Another LAN technology is Token Ring. It is described in IEEE standard 802.5 and based on the circulation of a token between stations. Each station must wait for the token in order to be authorized to transmit on the shared medium here referred to as a ring, thus completely solving the collision problem here above discussed. Indeed, this has proved to allow a better utilization of the shared medium. On the other hand, token ring technology is more expensive, more complex, and therefore less widespread in today's LAN networks.

Thus, it is a broad object of the invention to provide an improved, collision-free, Ethernet technology.

It is another object of the invention to allow this improved Ethernet to be useable over the current inexpensive, highly utilized, and well-known CSMA/CD Ethernet network infrastructure.

It is a further object of the invention to permit the passing-token mechanism of the Token Ring LANs to be efficiently carried out over existing Ethernet networks so that a physical Ethernet network becomes collision free, and therefore can be utilized at higher rates.

It is yet another object of the invention to permit collision and collision-free mechanisms to coexist on a single Ethernet network.

Further objects, features and advantages of the present invention will become apparent to those skilled in the art upon examination of the following description with reference to the accompanying drawings.

SUMMARY OF THE INVENTION

A method and a system for enabling a collision-free protocol for transmitting frames between stations connected over a shared transmission medium such as a medium that complies with the IEEE 802.3 standard (i.e., Ethernet LANs) are disclosed. A logical ring is formed between connected stations and a token is circulated among the connected stations that are part of the logical ring (not all connected stations are required to be part of the ring). Hence, transmitting from any one station that is part of the logical ring is permitted only while that station holds the token, thereby preventing collisions from happening.

Thus, the invention provides an improved, collision-free protocol that operates over a standard Ethernet infrastructure, yet remains compatible with the standard collision protocol.

DETAILED DESCRIPTION

Figure 1:
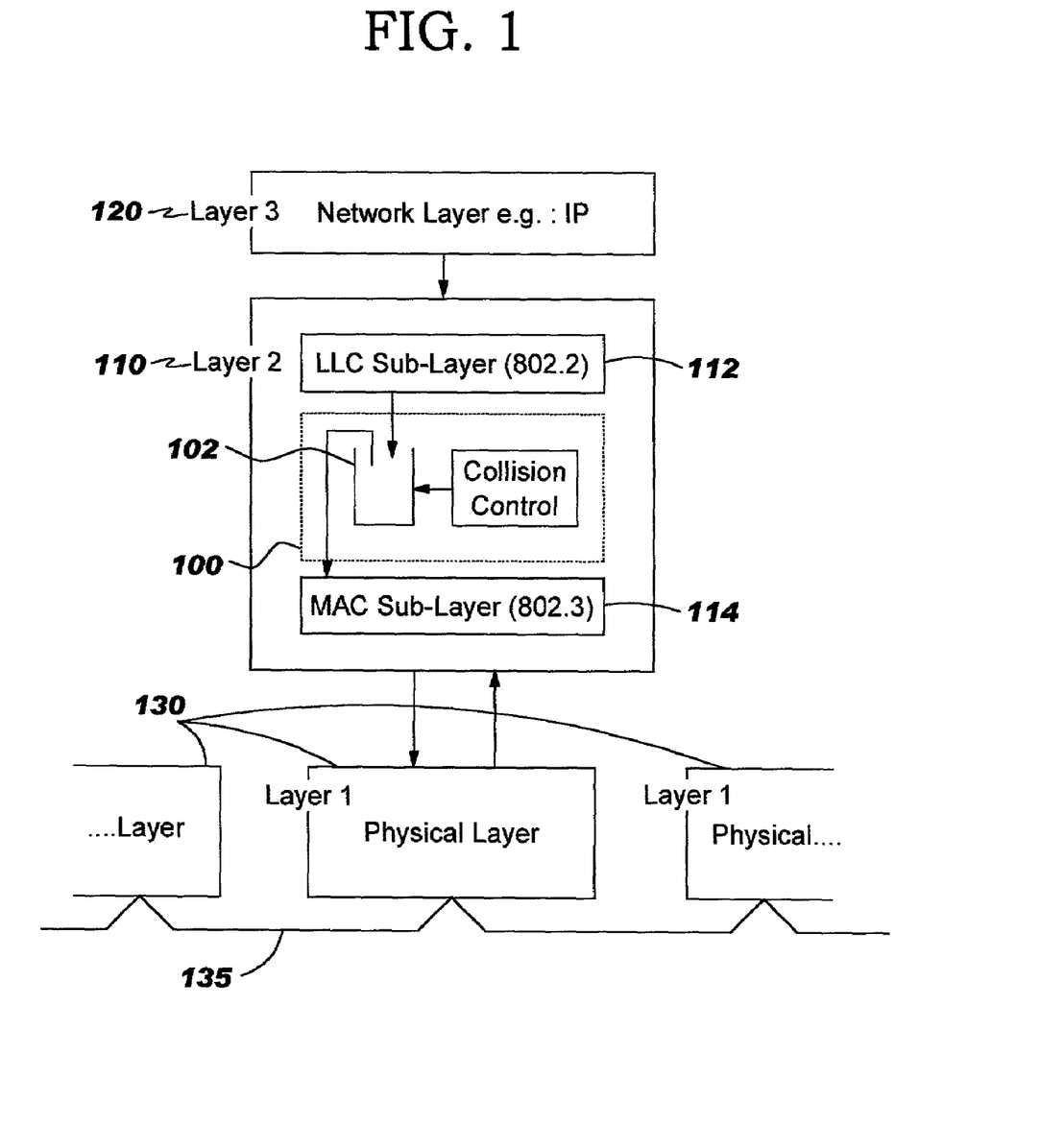
FIG. 1 shows the placement of the new collison control sub-layer introduced by the invention.

FIG. 1 concerns the basic modification brought by the invention to the set of Ethernet protocols. The invention introduces a new sub-layer 100, just below the Logical Link Control (LLC) 112, the upper portion of the data link layer for local area networks of the Ethernet protocol as defined in IEEE standard 802.2. The LLC sub-layer presents a uniform interface to the user of the data link service i.e., the network layer or layer 3 120 of the OSI reference model (a hierarchical structure of seven layers by the International Standards Organization that defines the requirements for communications between two computers). The network layer protocols establish, maintain and terminate end to end (network) links. These protocols route messages across the network(s) between two computer stations. When using the TCP/IP suite of protocols, the most largely used of all protocols for operating LANs, this role is played by the Internet-work or IP layer of the TCP/IP suite.

Beneath the LLC sub-layer there is normally the Media Access Control (MAC) 114 sub-layer defined in IEEE standard 802.3. LLC and MAC are part the OSI layer 2 or Data Link layer 110. These protocols provide reliability to the physical layer transmission by ordering the data into frames and adding error checking and addressing information. Layer 1 or the physical layer 130 is responsible for establishing, maintaining and ending physical connections (point to point) 135 between computer stations.

Figure 2:
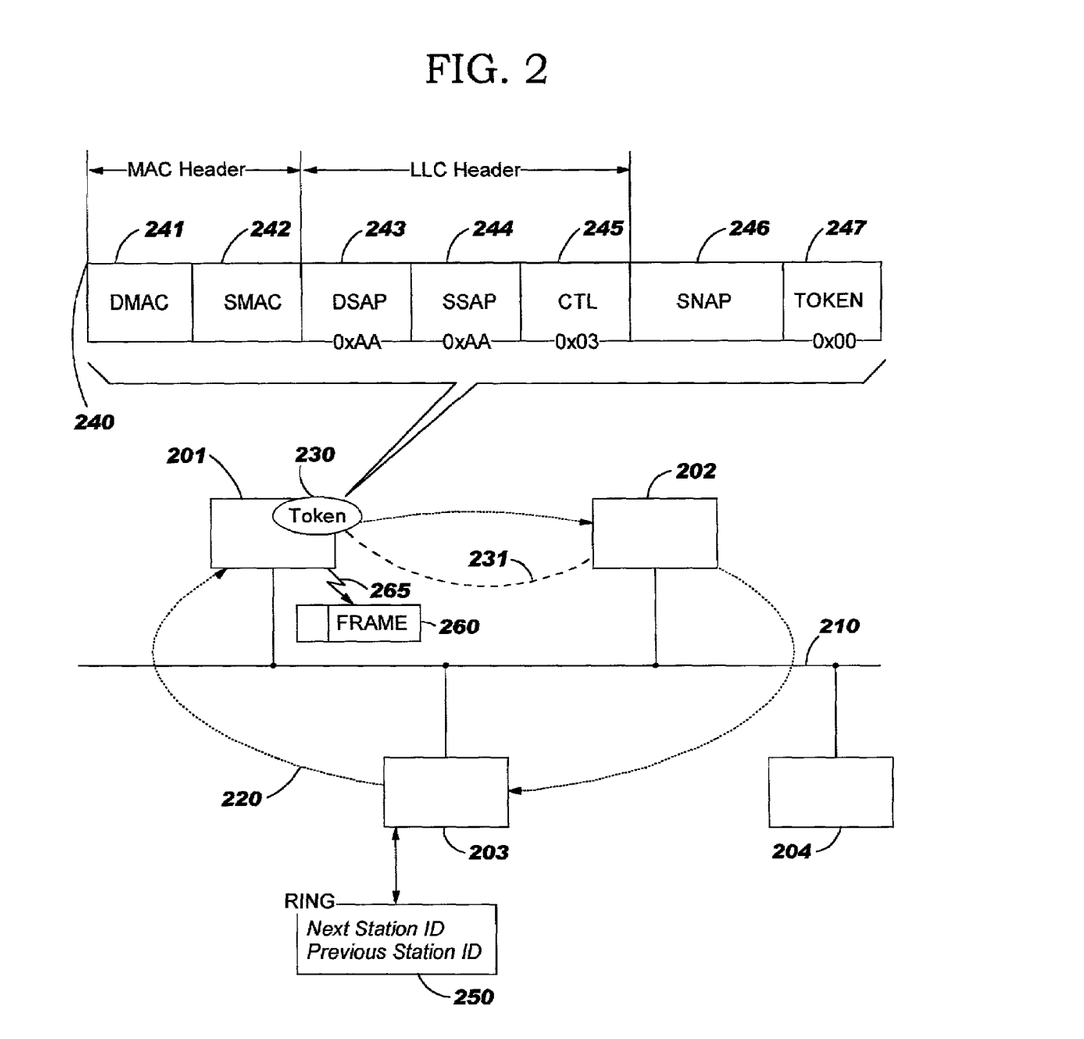
FIG. 2 depicts a logical ring per the invention.

Thus, the invention introduces a collision control sub-layer 100, in layer 2 110, between MAC sub-layer 114 and LLC sub-layer 112, so as to prevent collisions from ever occurring. The role of the collision-control sublayer is to manage a token, as shown in FIG. 2, in order to grant a station permission to transmit on the Ethernet segment. This requires the use of a transmit queue 102 in which frame(s) to be forwarded are temporarily held whenever it is necessary i.e., when a station does not hold the token, so that only one station connected on the shared transmission medium 135 is authorized to transmit at a time.

FIG. 2 is a view of an Ethernet LAN segment where the stations 201, 202, 203 physically connected on the shared medium 210, exactly as with a regular collision Ethernet LAN, are organized so that they form a logical ring 220. This is achieved through the circulation of a token 230 which takes the form of a special Ethernet frame 240, forwarded 231 from one station to a next one, e.g., from 201 to 202. The token comprises the following information:

An Ethernet Destination MAC address 241 i.e., the MAC address of the next ring station, 202 in this example.

An Ethernet Source MAC address 242 i.e., the MAC address of the station sending the token, 201 in this example.

A destination SAP (Service Access Point) 243 which, in the OSI model already mentioned, identifies the individual application on a host which is sending a packet. A destination SAP address 243 of 0xAA is however used here which is the standard way of actually defining the type of application in the following SNAP (SubNetwork Access Protocol) field.

A source SAP 244, i.e., the counterpart of the here above destination SAP. It takes a value of 0xAA too.

A control field 245 which takes the value of 0x03 to indicate this is a UI (Unnumbered Information) frame. The five above fields are the standard Ethernet MAC 241, 242 and LLC 243, 244, 245 header fields. They are not specific to the invention. Only the two following fields are specific:

A SNAP 5-byte header field introducing a new Ether-type i.e., a collision-free Ethernet ring 246.

A 1-byte token field 247 to help managing the circulation of the token, however not mandatory, and which takes a default value of 0x00.

Therefore, the token is a standard Ethernet frame uniquely identified through its SNAP field 246. Its sole possession, by a station, is thus the implicit permission to use the shared transmission medium on which a functional frame can be placed before token is passed to the next station in sequence.

Hence, logical ring 220 is just a list of stations pertaining to the ring. Actually, each station needs only to hold a record of the next and previous station identifiers (ID) 250 e.g., under the form of their MAC addresses. Thus, when a station like 201 has the token, it is allowed to transmit one and only one frame destined to another station (if it has indeed something to transmit) while holding the token. Transmission 265 is simply achieved by placing the functional frame 260 on the shared transmission medium 210 irrespective of its mode of propagation (unicast, multicast or broadcast) so that the receiving station(s), that are listening, can catch it. At completion of transmission, the station that currently holds the token 201 must forward it 231 through the shared transmission medium, to the next station in sequence of the logical ring, i.e., 202 in this particular example, using the MAC address found in an associated record similar to 250 and so on.

Not all stations connected on the same LAN segment need to participate in the collision-free ring 220 thus formed. The invention provides that both types of protocols (collision and collision-free) may coexist at any given instant so that a station like 204 needs not to implement the new protocol while still being able to communicate with all the others connected on the shared transmission medium 210, however using the regular collision protocol.

Figure 3:
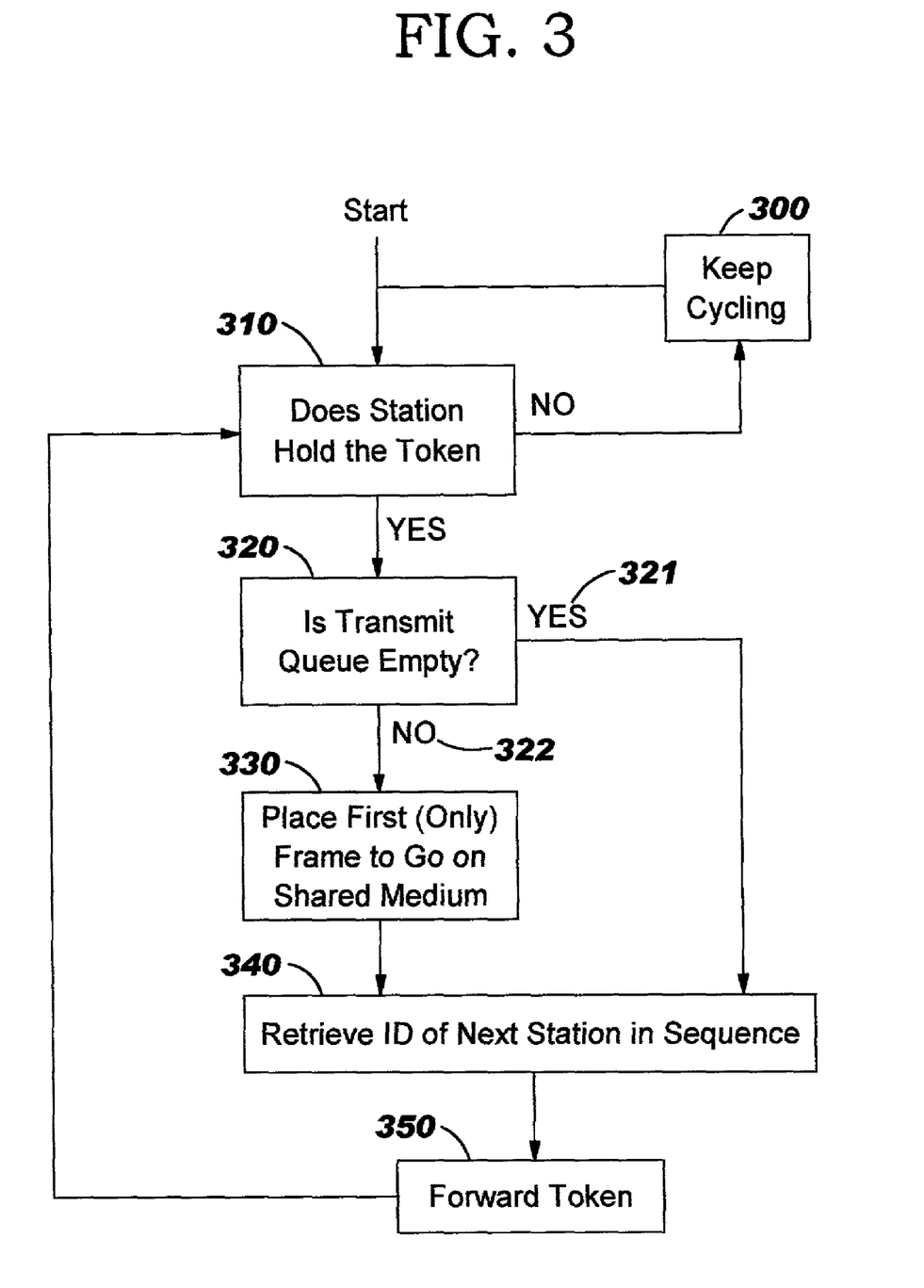
FIG. 3 Shows steps of the method for transmitting.

FIG. 3 shows steps of the method executed in any of the stations pertaining to a ring in order to transmit a frame over the shared transmission medium. A station keeps waiting 300 as long as it does not hold the token. When a station holds the token (because it received the token from the previous station in the ring), so that the answer to question 310 is positive, the next step 320 is to check if at least one frame is ready to go i.e., if the transmit queue is non-empty. If there is indeed something to transmit 322 then, the first or only frame ready to go is de-queued and placed on the shared transmission medium 330. Irrespective of whether the queue is empty 321 or not 322, the next step is to retrieve the ID of the next station in sequence in the ring 340 i.e., the station to which the token must be in turn transmitted 350. At completion of this step, the transmit method resumes at step 310, waiting until the token is received again after having gone through all the other stations participating into the ring.

Figure 4:
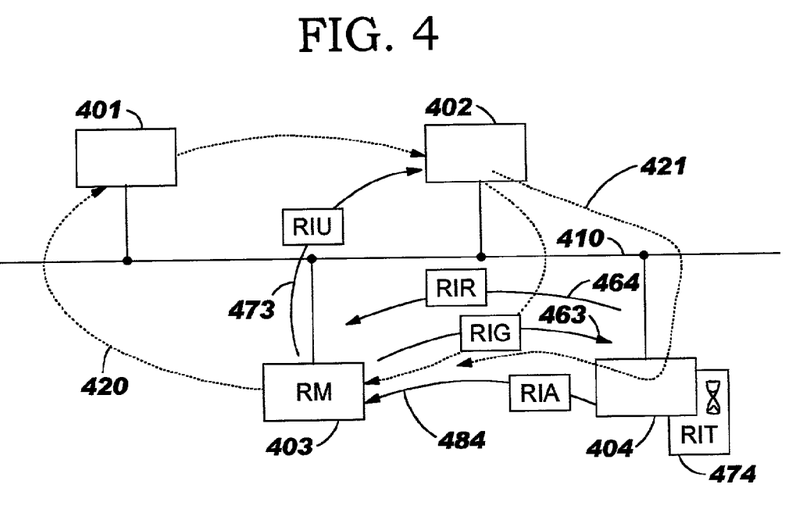
FIGS. 4 and 5 discuss how a logical ring is formed and managed through the addition and removal of stations.

FIG. 4 discusses the insertion of a new station 404 into the ring 420 when, e.g., a computer is connecting onto the Ethernet transmission medium 410 or because a computer is turned on. FIG. 4 assumes that ring 420 is already formed and that a 'Ring Manager' (RM) 403 has been previously elected. This aspect of the invention is further discussed in following figures. Then, the new connecting station 404 must first issue a 'Ring Insert Request' (RIR) message 464. This can be achieved under the form of a broadcast message that all stations will receive, and on which only RM will act. It may be, as well, a message to a predefined functional address (part of the collision-free protocol definition) so that all connecting stations, which know in advance this functional address, use it to send RIR directly to an assumed RM. Upon sending an RIR message, the connecting station also triggers a 'Ring Insert Timer' (RIT) 474, after which it waits for an answer from RM 403. At this stage there are three possibilities listed hereafter. Only the second one is actually illustrated by FIG. 4, i.e., when insertion into an already formed ring is indeed successful, which is the common case.

RIT 474 expires without any response received from an assumed RM. Then, connecting station 404 must assume it is the first to connect or the first to want to form a ring. Hence, this first connecting station must elect itself as a RM. This is also further discussed in next figures.

An existing RM 403 indeed responds, as illustrated in the example of this figure, with a 'Ring Insert Granted' (RIG) message 463. The RIG message includes the MAC addresses of the next station 403 (i.e., RM itself) and the previous station on the logical ring 402, from where the new station 404 is thus to be inserted. These are the addresses that the new inserted station will subsequently use when passing the token, as explained previously in FIG. 2. A corresponding modification must also be done in the station that was previously located just before RM in the ring, namely 402. Hence, RM forwards it a 'Ring Insert Update' (RIU) message 473 too. Upon receiving this message station 402 must update its next station address (from RM to the address of the new inserted station). Finally, the new inserted station acknowledges the insertion by sending back, directly to RM, a 'Ring Insertion Acknowledgment' (RIA) message 484 so as to end successfully the insertion process. At completion of the insertion process ring 420 that included stations 403, 401, 402 now also includes station 404 forming a new larger ring 421.

A 'Ring Insertion Denied' (RID) message is received in place of a RIG message by the connecting station (this is not however illustrated in FIG. 4). In this case the new connecting station must resume with a new complete insertion process as explained above. This is needed to take care of the border cases when two computers are trying to connect at the same time in order to avoid the election of both as RM. This is also further discussed below.

Figure 5:
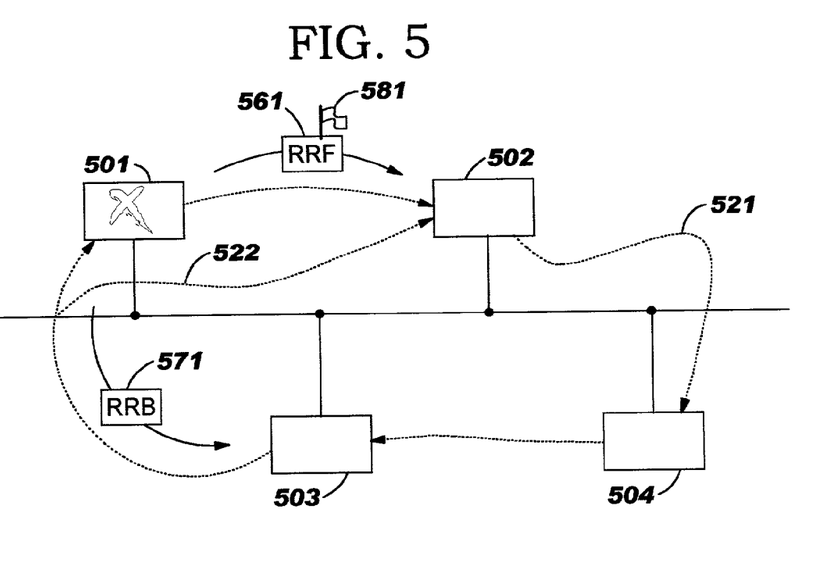

FIG. 5 discusses the general case of the removal of a station from a formed ring 521. This is simply achieved, from the station to be removed, which informs the next and previous station on the logical ring before actually leaving the ring. If, for example, station 501 must leave the ring, currently comprised of the four stations 501, 502, 504, 503, the leaving station must inform the next station in sequence 502 with a 'Ring Removal Forward' (RRF) message 561. Also, the previous station 503 must be informed too, with a 'Ring Removal Backward' (RRB) message 571, so that the ring is not broken. The end result is that the removed station is, on completion of the removal process, skipped, hence resulting in the formation of a new ring 522.

Two special cases must also be considered:

Firstly, when the leaving station is also the Ring Manager, then the forwarded RRF message contains a flag. Thus, if the leaving station 501 was indeed playing the role of Ring Manager it must add a flag 581 to the RRF message it sends 561 so that the next station in sequence i.e., 502 in this example, is informed to take over the role of Ring Manager for the new updated ring 522 which is further discussed in FIG. 8.

Secondly, if the leaving station is the last one (this was a 'single-station ring' which has little practical interest and should normally be a transient state when a ring is being formed or is being disbanded), then no messages needs to be issued.

Figure 6:
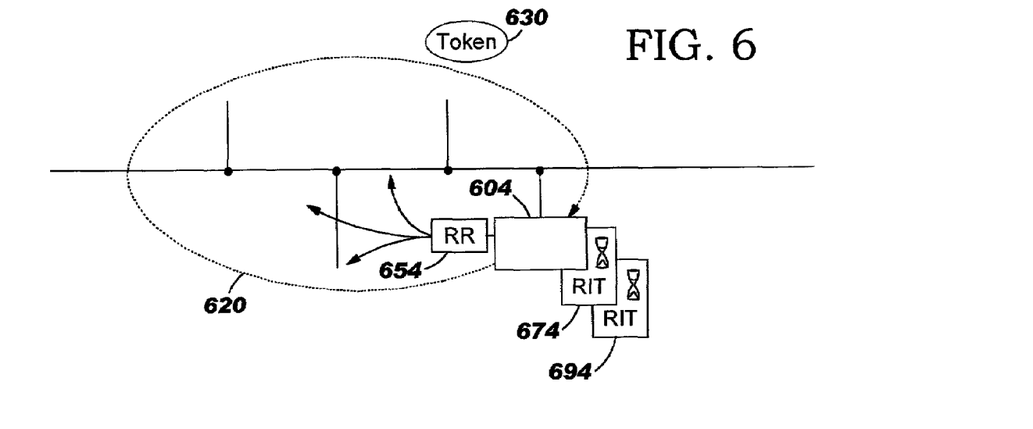
FIG. 6 discusses how to recover from a lost token.

FIG. 6 shows the loss (for whatever reason) of the token 630 by the ring 620. This is potentially detectable by any station e.g., station 604 because every station is equipped with a 'Ring Token Timer' (RTT) 694 on top of the RIT 674 previously discussed. If RTT elapses, then the detecting station issues (broadcasts) a 'Ring Restart' (RR) message 654 destined to all other stations, so that the formation of the ring is restarted from scratch which is further discussed in FIG. 7 hereafter.

Figure 8:
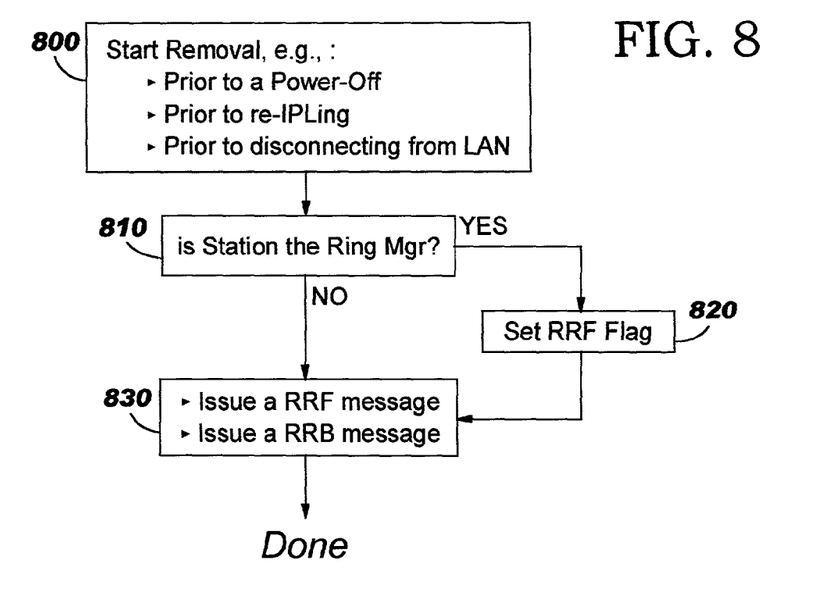
FIG. 8 shows the steps of the method for removing a station.

Typically, the token is lost whenever a station is powered off without executing the steps of the method discussed here after in FIG. 8 and provides an orderly removal that does not break the ring to which the station was connected.

Figure 7:
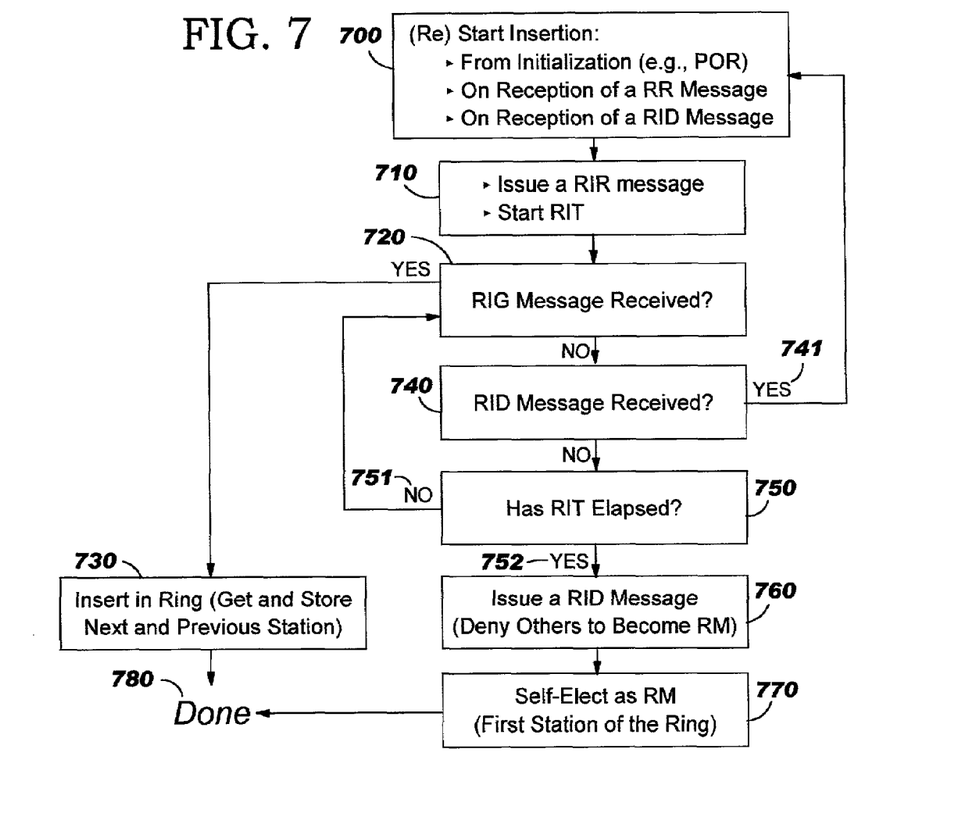
FIG. 7 shows the steps of the method for inserting a station.

FIG. 7 is a diagram that describes steps of the method according to the invention when a station wants to join a ring. This usually happens 700 when a station is first initialized or reinitialized i.e., when a computer connected on the Ethernet LAN is turned on or is re-IPL'ed. Also, on reception of a 'Ring Restart' (RR) message (e.g., because the token has been lost) all stations must resume their insertion process so as to form a new operative ring from scratch. And, insertion must also be re-attempted on reception of a 'Ring Insertion Denied' (RID) message. This situation may happen if a 'Ring Manager' (RM) has just been elected. This is further discussed hereafter. Then, the first action 710 of a station wishing to join the ring is to issue a 'Ring Insert Request' (RIR) message and, simultaneously, to trigger a 'Ring Insert Timer' (RIT).

If a RM is already present a 'Ring Insert Granted' (RIG) message 720 is normally soon received. In which case the station is actually inserted 730, thus getting from RM the addresses of the next and previous stations of the ring that must be remembered by the new inserting station as already discussed with reference to FIG. 2. However, a Ring Insertion Denied (RID) message 740 may be received instead. If this is the case, it indicates that a new ring is being formed and that another station was quicker to elect itself as a RM but had no time to answer the RIG message 720. When this happens 741, on receiving a RID message, the station wishing to insert must resume at the initial step 700 so as to reissue a RIR message that will normally be answered by the new RM. The other possibility is that the RIT expires 750. When this occurs 752, it means there is no RM and that the inserting station must, from now on, play this role 770. Prior to this, or simultaneously, a RID message must be issued 760 so that no other station, engaged in the same process, could possibly self-elect as RM too. While none of the events of steps 720, 740, 750 are occurring, the insertion mechanism is normally looping 751, waiting until any of them actually occurs. Hence, at completion of the insertion, the new station is inserted 730 and may possibly become the RM 770.

FIG. 8 shows steps of the method per the invention when a station must leave the ring. Removal of a station from the ring normally happens 800 when a computer is powered off, is disconnected from the LAN, or is re-IPL'ed. Then, as already discussed in FIG. 5, the leaving station has, just prior to leaving, to inform its next and previous ring stations it is going to remove itself from the ring, so that they may update respectively their own previous and next stations so that the ring is not broken. As explained, this is done by issuing two messages 830, i.e., a RRF message to the next station in sequence and a RRB message to the previous one. However, if the leaving station is the current RM 810 it must set the flag of the RRF message 820 so that the next station is informed to become the new RM.

Figure 9:
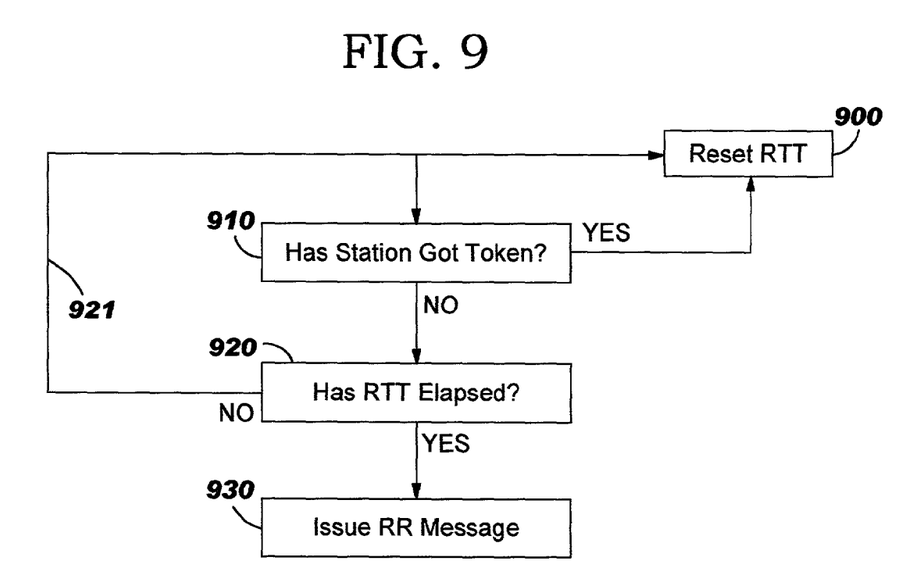
FIG. 9 shows the steps of the method for checking the circulation of the token.

FIG. 9 shows steps of the method according to the invention that deal with the circulation of the token. Every station on the ring continuously monitors for the reception of the token 910. Whenever the token is received the RTT is reset 900. If not, the RTT is checked 920. If the RTT has timed out, this triggers the sending of an RR message 930 so as to form a new ring since it is the indication that the token is lost. If, as normally expected, the RTT has not timed out 921 the station keeps waiting for the token to show up.

The invention claimed is:

1. A method over a collision LAN that comprises a plurality of stations physically connected over a shared transmission medium, for enabling a collision-free protocol for concurrently transmitting frames between all or part of the plurality of stations, the method comprising the steps of:
   forming a logical ring among all or part of the plurality of physically connected stations, the forming step including:
      upon starting insertion of said joining station,
      issuing an RIR (Ring Insert Request) message towards an assumed RM (Ring Manager);
      starting an RIT (Ring Insert Timer);
      checking whether an RIG (Ring Insert Granted) message is received or not;
      if said RIG is received, inserting said joining station in said logical ring to complete said insertion of said joining station in said logical ring;
      if said RIG is not received, checking whether an RID (Ring Insert Denied) message is received,
      if said RID is received, restarting insertion of said joining station;
      if said RID is not received, checking whether said RIT has elapsed;
      if said RIT has not elapsed, resuming at checking RIG step; and
      if said RIT has elapsed, issuing said RID message, self-electing said joining station to play the role of RM;
   circulating a token between stations of the logical ring; and
   transmitting from any one station that is part of the logical ring only while holding the token, to prevent collisions from happening upon transmitting over the shared transmission medium.

2. The method of claim 1, wherein said RM, upon issuing said RIG message towards said joining station, also issues an RIU (Ring Insert Update) message to an immediate previous station over said logical ring.

3. The method of claim 1, wherein said forming step includes, in a station wishing to leave said logical ring, the further steps of:
   upon starting removal of said leaving station, checking whether said leaving station is said RM or not;
   if said leaving station is said RM, setting a flag in an RRF (Ring Removal Forward) message;
   if said leaving station is not said RM, skipping the setting step;
   issuing said RRF to said immediate next station of said logical ring; and
   issuing an RRB (Ring Removal Backward) message to said immediate previous station of said logical ring.

* * * * *